United States Patent [19]

Shimoyama

[11] 4,138,662

[45] Feb. 6, 1979

[54] CHARACTER READER

[75] Inventor: Atsushi Shimoyama, Kawasaki, Japan

[73] Assignee: Fujitsu Limited, Japan

[21] Appl. No.: 849,705

[22] Filed: Nov. 8, 1977

[30] Foreign Application Priority Data

Nov. 15, 1976 [JP] Japan .................................. 51-137143

[51] Int. Cl.$^2$ .............................................. G06K 9/12
[52] U.S. Cl. .................... 340/146.3 MA; 340/146.3 Q
[58] Field of Search .......... 340/146.3 MA, 146.3 AC, 340/146.3 Q, 146.3 AQ

[56] References Cited

U.S. PATENT DOCUMENTS

| 3,573,730 | 4/1971 | Andrews et al. | 340/146.3 Q |
| 3,905,018 | 9/1975 | Gray | 340/146.3 MA |
| 3,930,231 | 12/1975 | Henrichon, Jr. et al. | 340/146.3 AC |
| 3,975,709 | 8/1976 | Beun et al. | 340/146.3 MA |

*Primary Examiner*—Leo H. Boudreau
*Attorney, Agent, or Firm*—Staas & Halsey

[57] ABSTRACT

Disclosed is a character reader for reading characters or patterns. The character reader is operated by a processor and a main memory cooperating therewith. The main memory is divided into a flag byte area and video bytes area. The video bytes area stores each video signal corresponding to each of the scanning lines scanned by a scanner contained in the character reader. The flag byte area stores respective bits of control information corresponding to each of the video signals. The processor receives the video signal sequentially together with respective bits of control information concerning each video signal, then processes and recognizes each video signal under control of respective bits of control information.

8 Claims, 10 Drawing Figures

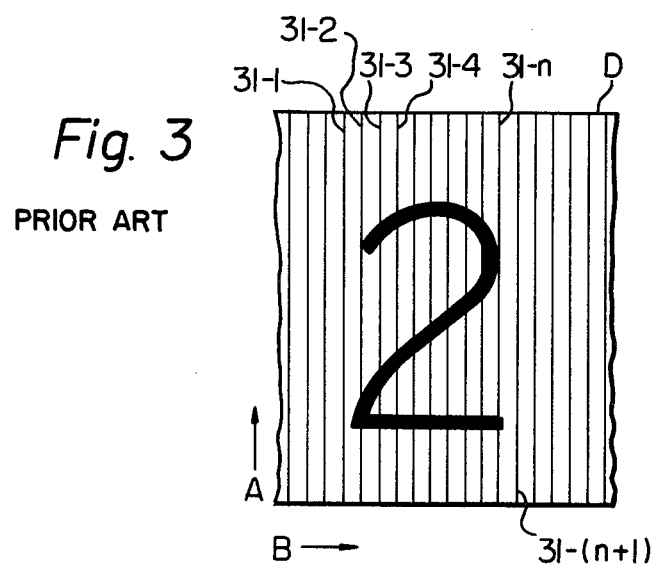
Fig. 3
PRIOR ART
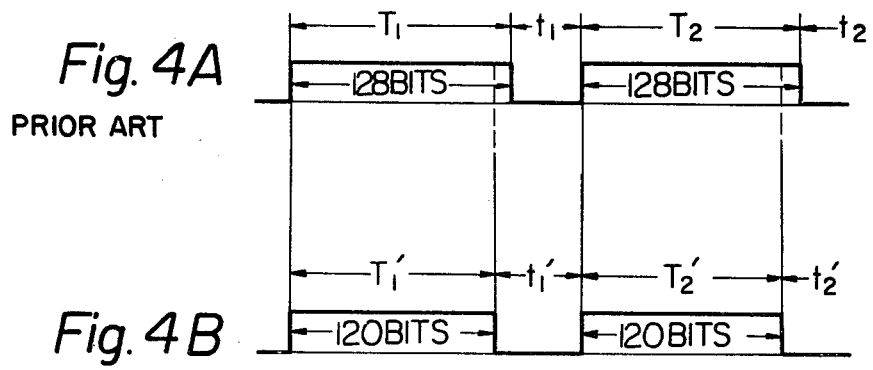
Fig. 4A
PRIOR ART
Fig. 4B

BIT

CHARACTER READER

The present invention relates to character readers cooperating with processors, and more particularly to character processing methods and circuits used in such character readers.

A character reader operates to scan characters drawn on a document by using an electro-optical pick up scanner such as a vidicon tube system or a flying spot scanner system. The video signals produced by the scanner are converted from analogue video signals to digital video signals by using an A-D (Analogue-Digital) converter. The digital video signals are then quantized. The quantized video signals are further processed by utilizing hardware, that is, electronic devices, and recognized for certain character indications. The character reader of the prior art, as will be described hereinafter, has the following three defects. Firstly, the hardware of the prior art character reader is comprised of a first means for producing an outline of the character to be read in order to determine the area on which the character is located in the document. The first means is necessary for reducing the number of memories which store the quantized video signals. However, this means is constructed by utilizing large-scale hardware. Secondly, the hardware of the prior art is comprised of both a second means for recognizing handwritten characters and a third means for recognizing typed characters or patterns. Accordingly, such hardware becomes relatively complicated in construction. Thirdly, the hardware of the prior art is comprised of a multiplexer means which has the function of distributing a quantized video signal corresponding to a certain character to one of the one-character memories. The multiplexer means also has the function of determining the time at which each of the one-character memories should cooperate with the above-mentioned second or third means. The reason why the above functions are required is that it takes a relatively long time to recognize the handwritten characters as compared to the time necessary for recognizing the typed characters. Usually, the operation of the multiplexer means is relatively complicated.

As mentioned above, the character reader of the prior art must be comprised of large-scale hardware which has a complicated construction and is difficult to operate.

In order to minimize the above-mentioned three defects of the prior art, it may be desirable to process and recognize the above-mentioned quantized video signals by utilizing software with the aid of a processor. It is easily known to one skilled in the art that a character reader cooperating with a processor will provide a far superior character reader than a character reader cooperating without any processors. This is because most of the functions of the above-mentioned complicated and difficult-to-operate hardware may be performed by a simple processor. In the above basic processor aided character reader, further development and improvement can be possible for obtaining a processor aided character reader which can process and recognize characters to be read with high efficiency. Such high efficiency feature will become more apparent in the description mentioned hereinafter.

Therefore, it is the object of the present invention to provide a character reader which cooperates with a processor and which operates with high efficiency and more particularly to provide a method and an apparatus for processing data regarding the above-mentioned quantized video signals, which data being sequentially stored in a main memory, the essential unit for operating the processor.

The present invention will be more apparent from the ensuing description with reference to the accompanying drawings wherein:

FIG. 3 depicts a conventional scanning chart for scanning the particular character "2" by means of a scanner 11 shown in FIG. 1;

FIG. 4A depicts a conventional timing chart for scanning a particular character drawn on the document D.

FIG. 4B depicts a timing chart for scanning a particular character drawn on the document D according to the method of the present invention;

Figures 1, 2:
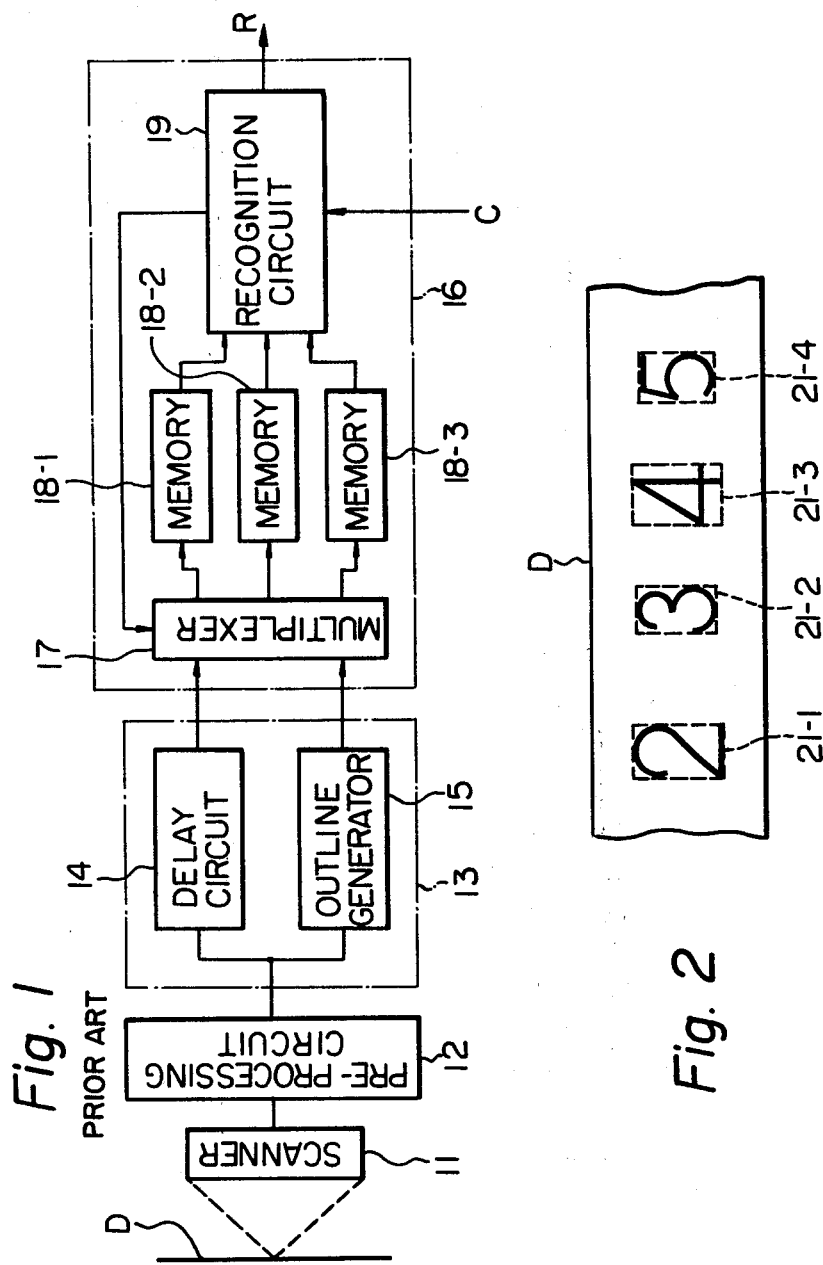
FIG. 1 is a schematic block diagram showing a character reader of the prior art.
FIG. 2 shows a document D (shown in FIG. 1) on which the particular numerals "2", "3", "4" and "5" are drawn.
Figure 7:
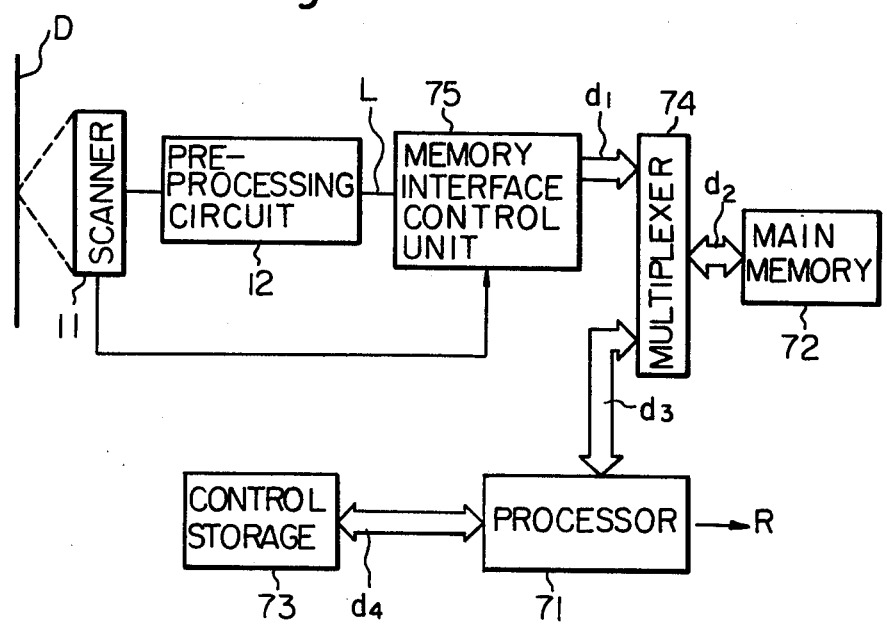
Figure 8:
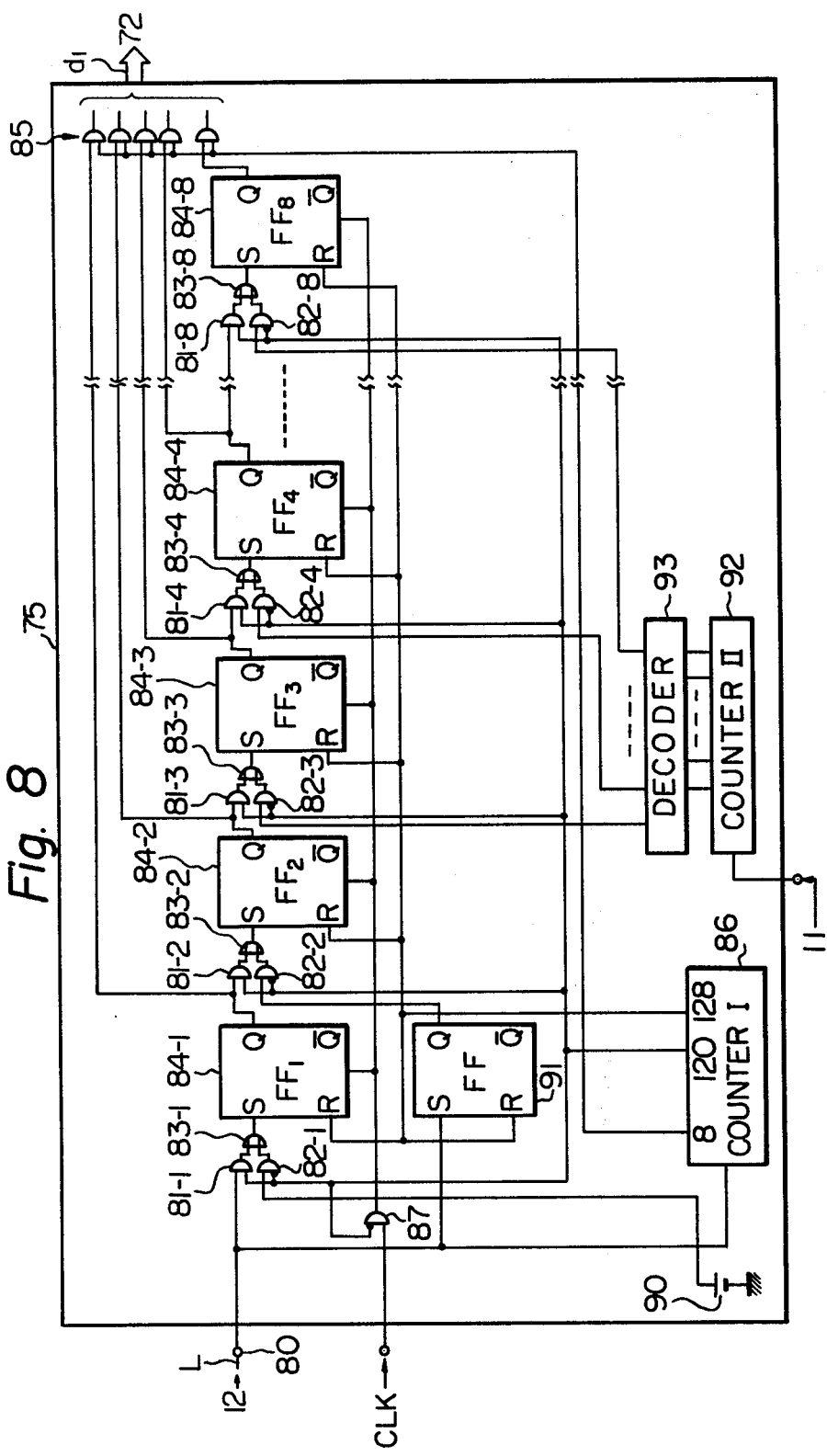

FIG. 7 is a schematic block diagram showing a character reader according to the present invention; and FIG. 8 illustrates a detailed block diagram of a memory interface control unit 75 of the present invention shown in FIG. 7. de FIG. 1 is a schematic block diagram showing a character reader of the prior art. In FIG. 1, the reference numeral 11 represents a scanner which scans characters to be read located on a document "D". Thereafter, the scanner 11 converts analogue video signals to digital video signals by means of an A-D converter (not shown) contained therein and further converts digital video signals into quantized video signals. The quantized video signals are applied to a character signal supplier 13 by means of a pre-processing circuit 12. The pre-processing circuit 12 re-forms the quantized video signals when the quantized video signals include a defective character pattern in order to form quantized video signals which indicate a normal character pattern. The video signals from the pre-processing circuit 12 are applied to both the delay circuit 14 and the outline generator 15 in the character signal supplier 13. The outline generator 15 is comprised of a large number of OR circuits (not shown) and an adder (not shown) which receives the output signals from the OR circuits, each of the OR circuits for detecting whether or not at least one of the "1" bits exists in the quantized video signals in a respective scanning line scanned by the scanner 11. The above-mentioned "1" bit corresponds to one of the black points comprising a certain character. As a result, the output signals from the outline generator 15 indicate the outline of the character. Thus, a square area including the character contained in the document D is defined. On the other hand, the delay circuit 14 is comprised of a large number of registers (not shown), each register for storing each quantized video signal produced by each scanning line scanned by the scanner 11. Then, the video signals stored in some registers are applied to a recognizing and processing unit 16 by way of a multiplexer 17. Some of these registers are specified by the multiplexer 17 and correspond to the registers which belong to the above-mentioned square area. The square area is shown in FIG. 2 by the dotted line 21-1. The other square areas are also shown in FIG. 2 by the dotted lines 21-2, 21-3 and 21-4. FIG. 2 shows the document D (shown in FIG. 1) on which the numerals "2", "3", "4" and "5" are drawn.

Returning to FIG. 1, the video signals representing the square area for example, the square area 21-1, are transferred to a one-character memory 18-1 and stored therein by way of the multiplexer 17. In this example, the one-character memory 18-1 stores the numeral "2". The data stored in the memory 18-1 is applied to a recognition circuit 19. The recognition circuit 19 has the function of recognizing the character pattern and produces a signal R as a result of such recognition. In this example, the result is the numeral "2". Usually, it takes a relatively long time for the recognition circuit 19 to recognize the character pattern; on the other hand the scanner 11 produces scanned video signals at a constant high speed. Accordingly, buffer memories are required, which buffer memories are respectively represented by one-character memories 18-2 and 18-3 in FIG. 1. According to FIG. 2, the one-character memory 18-2 stores the numeral "3", and the one-character memory 18-3 stores, the numeral "4". When processing of the data in the memory 18-1 is finished in the recognition circuit 19, the video signals which indicate the numeral "5", according to FIG. 2, are then stored in this memory 18-1. The above-mentioned distribution of the video signals to the memories 18-1, 18-2 and 18-3 is operated by the multiplexer 7. The multiplexer 17 alternately operates in combination with the means for recognizing handwritten characters, and in combination with the means for recognizing typed characters, both types of means being contained in the recognition circuit 19. When the scanner 11 scans handwritten characters, the former means is activated by one part of control information in an external control signal C; while when the scanner 11 scans typed characters, the latter means is activated by another part of control information in the signal C.

As explained above by referring to FIGS. 1 and 2 the character reader of the prior art must be comprised of large-scale hardware. However, it may be recognized by one skilled in the art that most of the large-scale hardware may be eliminated by utilizing a simple processor in a character reader.

The present invention provides a unique method and apparatus for forming data relating to the video signals. Both method and apparatus can be applied to a processor cooperating with a character reader. The processor aided character reader may basically be comprised of a scanner (same as the scanner 11 in FIG. 1), a pre-processing circuit (same as the pre-processing circuit 12 in FIG. 1), a conventional processor, a conventional main memory, and a conventional multiplexer. The main memory can directly store the quantized video signals therein by means of the multiplexer. The quantized video signals stored therein serve as the data to be processed by the processor. The data thus stored in the main memory is sequentially transferred to the processor by means of the multiplexer, and then processed by the processor for recognition of characters to be read under control of programs, sequentially produced from a conventional control storage. The basic processor aided character reader mentioned above requires no large-scale hardware as that of the character reader of the prior art. Thus, the extensively large-scale hardware of the prior character reader is eliminated therefrom by using a conventional processor, main memory, control storage and multiplexer.

In the above-mentioned basic processor aided character reader, the present invention provides a unique method for producing data which can be directly stored in the main memory. Usually, the character, for example, the numeral "2" drawn on the document D shown in FIG. 2, is scanned in a manner such as that shown in FIG. 3. FIG. 3 depicts a scanning chart for scanning the numeral "2" by means of the scanner 11 (FIG. 1) wherein a first scanning line 31-1 is created in a direction along the arrow A during a time $T_1$ shown in FIG. 4A. FIG. 4A depicts a conventional timing chart for scanning a certain character drawn on the document D. The scanning line is shifted by one column in a direction along the arrow B in FIG. 3 during a time $t_1$ (FIG. 4A), and a second scanning line 31-2 is scanned in a direction along the arrow A during a time $T_2$. Similarly, the following scanning lines 31-3, 31-4 . . . 31-n are scanned sequentially.

Figure 5A:
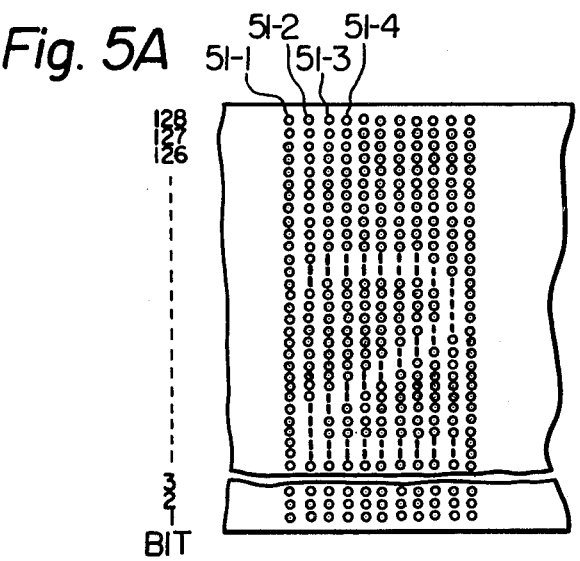
FIG. 5A depicts a pattern of bits arranged in the main memory of a basic processor aided character reader.

FIG. 5A depicts a patern of bits arranged in the main memory of the basic processor aided character reader. When the numeral "2" shown in FIG. 3 is scanned by the scanner 11 (FIG. 1) the pattern of bits arranged in the main memory will become a logic pattern composed of "0-1" elements as shown in FIG. 5A. The first memory array 51-1 in FIG. 5A corresponds to the first scanning line 31-1 shown in FIG. 3. The second memory array 51-2, corresponds to the second scanning line 31-2 in FIG. 3. Similarly, the following memory arrays 51-3, 51-4 . . . 51-n correspond respectively to the scanning lines 41-3, 41-4 . . . 41-n. Each of the memory arrays is comprised of for example, 128 bits (see left column in FIG. 5A). In other words, each memory array is comprised of 16 bytes (1 byte is equal to 8 bits).

Figure 5B:
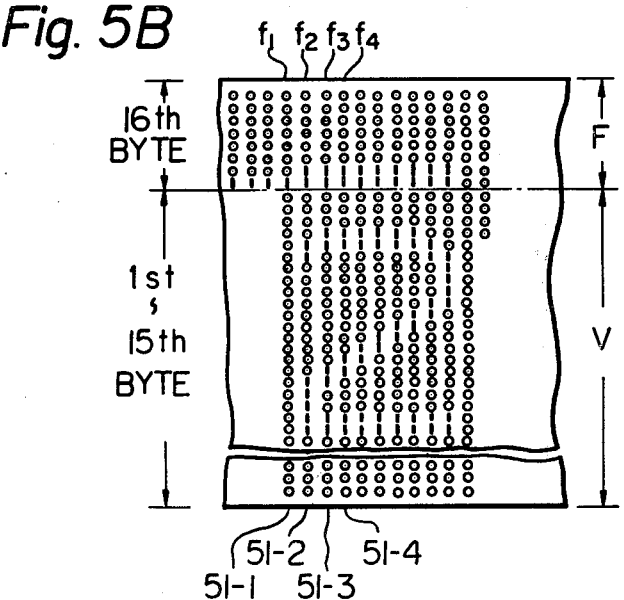
FIG. 5B depicts a pattern of bits arranged in the main memory of a processor aided character reader according to the present invention.

FIG. 5B depicts a pattern of bits arranged in the main memory of the processor aided character reader according to the present invention. In FIG. 5B, the memory arrays are divided into two areas, that is a flag byte area F and a video bytes area V. The video bytes area V is comprised of the 1st byte through the 15th byte and stores conventional quantized video signals therein. Accordingly, the flag byte area F is a newly created area according to the present invention. The flag byte area F is comprised of the 121st bit through the 128th bit. The flag byte area F is comprised of a first flag byte $f_1$, a second flag byte $f_2$, and $f_3$ . . . $f_n$. The first flag byte $f_1$ is included in the first memory array 51-1 in FIG. 5B which stores the first video signal obtained by the first scanning line 31-1 (FIG. 3). Similarly, the flag bytes $f_2$, $f_3$ . . . $f_n$ are included in the memory arrays 51-2, 51-3 . . . 51-n which respectively store the video signals obtained by the scanning lines 31-2, 31-3 . . . 31-n (FIG. 3). These flag bytes $f_1$, $f_2$ . . . $f_n$ contain control information pertaining to the video signals obtained by the scanning lines 31-1, 31-2 . . . 31-n respectively. The above control information will be explained hereinafter.

FIG. 4B depicts a timing chart for scanning a certain character drawn on the document D according to the present invention. In FIG. 4B, during a time $T_1'$, the first scanning line 31-1 (FIG. 3) is scanned. At the same time, the first video signal comprising of 120 bits is stored in the main memory. During a time $t_1'$, the first flag byte $f_1$ is prepared and then stored in the main memory. During a time $T_2'$, the second scanning line 31-2 (FIG. 3) is scanned. At the same time, the second video signal comprising of 120 bits is stored in the main memory. During a time $t_2'$, the second flag byte $f_2$ is prepared and then stored in the main memory. It should be noted that since the flag byte area F is located on the main memory corresponding to the insignificant edge portion of the document D, effective video signals regarding the document D can still be produced as usual.

Figure 6:
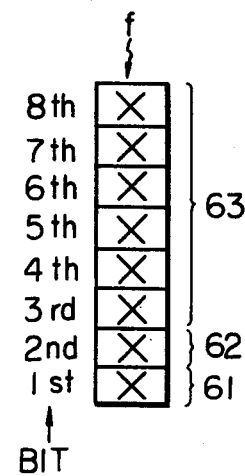
FIG. 6 shows the bit construction of a flag byte f containing certain bits of control information, wherein the flag byte f represents each of the flag bytes, $f_1, f_2 \ldots f_n$, shown in FIG. 5B.

FIG. 6 shows the bit construction of a flag byte f containing the above-mentioned control information, wherein the flag byte f represents each of the flag bytes $f_1, f_2 \ldots f_n$. In FIG. 6, a first bit 61 may contain one unit of the control information, that is a unit of validated information indicating that the video signal contained in the corresponding memory array is valid or invalid. If the video signal is valid, the first bit 61 becomes a logic "1", thus indicating to the processor that the corresponding video signal has not yet been processed. Accordingly, this video signal should be processed by the processor in an appropriate sequence. Contrary to the above, if the video signal is invalid, the first bit 61 becomes a logic "0", thus indicating to the processor that the corresponding video signal has already been processed. Accordingly, this video signal does not have to be processed by the processor. When a fresh video signal is stored in the video byte area V (FIG. 5B), it automatically becomes a logic "1". Next, when processing of the fresh video signal by the processor, is completed, this processor will then change the first bit from a logic "1" to a logic "0". The above-mentioned first bit 61 is useful for achieving a function similar to the function achieved by means of the aforesaid multiplexer 17 and by a plurality of one-character memories 18-1, 18-2 and 18-3 (shown in FIG. 1). Consequently, the complicated hardware comprised of the multiplexer 17 and the one-character memories (18-1 to 18-3) can be replaced by the above single first bit 61 according to the present invention. Furthermore, the delay circuit 14 and the outline generator 15 (both shown in FIG. 1) are not necessary in the character reader according to the present invention. This is because all the video signals pertaining to the document D except for the insignificant edge portion (refer to the flag byte area F in FIG. 5B) thereof, are directly stored in the main memory without any sampling of the square areas (refer to areas 21-1 through 21-4 in FIG. 2) containing the characters.

In FIG. 6, a second bit 62 may have one unit of the control information, that is a unit of abbreviated information indicating that the video signal contained in the corresponding memory array indicates a part of the character to be read or not read. For example, in FIG. 3, when the scanner scans the scanning lines 31-2 through 31-n, the video signals indicate significant video information, that is, the numeral "2". In this case, the second bit 62 becomes a logic "1". Contrary to the above, in FIG. 3, when the scanner scans the scanning line 31−(n+) and the following lines, the video signals indicate insignificant video information, that is, a white area on the document D. In this case, the second bit 62 becomes a logic "0". Whether or not each of the video signals indicates significant video information can be easily detected by a simple flip-flop, the set terminal of which receives the quantized video signals. When the bit of the quantized video signal changes from a logic "0" to a logic "1" that is the change from "white" to "black", the flip-flop is set to a logic "1" state and the second bit 62 (FIG. 6) becomes a logic "1". The second bit 62 is very useful for achieving a high-speed processing in the processor, wherein the logic "0" of the second bit 62 instructs the processor that the processor does not need to process the corresponding video signal. In other words, the processor can abbreviate the operation for processing this video signal. This is because, the video signal corresponds to the white area on the document, to which video signal the logic "0" is attached. This abbreviation of data can shorten the time required for processing and recognizing the character data contained in one document.

In FIG. 6, the third group of bits 63 comprised of the 3rd bit through the 8th bit may contain one unit of control informations, that is, a unit of classifying information indicating that the video signal contained in the corresponding memory array indicates one of the following symbols an alphabet letter, a numeral, a Chinese character or a Japanese syllable.

The unit of classifying information further indicates whether these characters are typed or handwritten characters, and furthermore indicates whether the video signal is a character or a bar-code, which bar-code being widely used in a POS (Point of Sales) system. Various kinds of information mentioned above are stored in the main memory together with their respective video signals. As mentioned previously by referring to FIG. 1, the recognition circuit 19 includes a means for recognizing respectively, typed alphabet letters, typed numerals, typed Chinese characters and so on, a means for recognizing, respectively, handwritten alphabet letters, handwritten numerals, handwritten Chinese characters and so on, and further includes a means for recognizing bar-codes. Therefore, an external control signal C is applied to the recognition circuit 19 and for determining which means must be activated. In this case, the external control signal C must be applied to the corresponding means at the exact time when this corresponding means starts to operate. This is because, the recognition circuit 19 does not know that each of the video signals produced sequentially from the one-character memories 18-1, 18-2 and 18-3 is a typed alphabet letter, a typed numeral, a handwritten alphabet letter, a handwritten numeral or a bar-code. Contrary to this, in the present invention, the processor can itself detect the beginning of its operation for recognizing the respective video signals and for discriminating the respective symbols by checking the third group of bits 63 in the flag byte f without receiving any external control signal similar to the conventional external control signal C of the prior art.

FIG. 7 is a schematic block diagram showing a character reader according to the present invention, which character reader embodies the above-mentioned method for forming the data comprised of the flag byte F and the video bytes V shown in FIG. 5B. In FIG. 7, the reference numerals 11 and 12 and the reference symbol "D" respectively represent the same members shown in FIG. 1 also designated by the same numerals and symbol. Furthermore, the reference numerals 71, 72, 73 and 74 represent the conventional members comprising a processor system and are, respectively, a processor, a main memory. a control storage and a multiplexer.

The block indicated by the reference numeral 75 designates the outstanding memory interface unit employed by the present invention. The memory interface control unit 75 receives the quantized video signals transmitted from the pre-processing circuit 12 via a line L and then the unit 75 provides each byte of the respective data comprised of the video bytes V and flag byte F (see FIG. 5B) sequentially to the main memory 72 via a data bus $d_1$, the multiplexer 74 and a data bus $d_2$. The data stored in the main memory 72 is supplied to the processor 71 via the data bus $d_2$, the multiplexer 74 and a data bus $d_3$ at an appropriate time when the data bus $d_2$ is not being occupied by the memory interface control unit 75. The data is processed by the processor 71 and utilized for recognizing characters or bar-codes which are read under the control of programs. Generally, the programs are produced sequentially from the control storage 73 via a data bus $d_4$. The result of such character or bar-code from the document D is provided from the processor, as indicated by the letter "R".

FIG. 8 is a detailed block diagram of the memory interface control unit 75 shown in FIG. 7. Quantized video signals are sequentially applied to a terminal 80 via the line L. In this case, AND gate circuits 81-1 through 81-8 are open and flip-flops 84-1 through 84-8, as one body, act as a shift register operated by basic clock pulses (CLK) preferably supplied from the scanner 11 (FIG. 7). When the eight flip-flops 84-1 through 84-8 have respectively stored each bit of the eight bits (1st bit through 8th bit) of the video signal, AND gate circuits 85 are opened and the first set of data is transferred to the main memory 72 via the data bus $d_1$. The first set of data becomes the first video byte which will be stored in the video bytes area V (shown in FIG. 5B). The gate circuits 85 are opened each time a first counter 86 finishes counting every group of eight bits of the video signal. Next, when the eight flip-flops 84-1 through 84-8 have respectively stored each bit of the eight bits (9th bit through 17th bit) of the video signal, the AND gate circuits 85 are opened as described before and the second set of data is transferred to the main memory 72. The second set of data becomes the second video byte which will also be stored in the video bytes area V (FIG. 5B). Such an operation is sequentially repeated with respect to the third video byte, the fourth video byte and so on. Finally, when storing of the fifteenth video byte is finished in the video bytes are V (FIG. 5B), AND gate circuits 82-1 through 82-8 are opened. At the same time, the AND gate circuits 81-1 through 81-8 are closed. Each output of the AND gate circuits (81-1 through 81-8) and each output of the AND gate circuits (82-1 through 82-8) are selectively applied to respective set terminals "S" of the corresponding flip-flops (84-1 through 84-8) by means of respective OR gate circuits (83-1 through 83-8).

After the producing the video bytes comprised of fifteen video bytes regarding one scanning line, the flag byte (see the flag byte f shown in FIG. 6) producing operation follows. In this case, after the counter I 86 finishes counting 120 bits (8[bit] × 15[byte]), the counter I 86 opens the AND gate circuits 82-1 through 82-8 and at the same time closes the AND gate circuits 81-1 through 81-8. Since an AND gate circuit 87 is also simultaneously closed, accordingly, the basic clock pulses (CLK) are not supplied to the flip-flops 84-1 through 84-8. When the basic clock pulses (CLK) are supplied to these flip-flops, the flip-flops act as a serial-in and parallel-out shift register, as mentioned hereinbefore. However, when the clock pulses (CLK) are not supplied thereto, these flip-flops act as a parallel-in and parallel-out register. In this case, the flip-flops 84-1 through 84-8 respectively provide the first bit 61, the second bit 62 and the third group of bits 63 of the flag byte f (see FIG. 6). As previously explained with reference to FIG. 6, the first bit 61 indicates a unit of the aforementioned validated information; the second bit 62 indicates a unit of the aforementioned abbreviating information; and the third group of bits 63 indicates a unit of the aforementioned classifying information. The information indicated by the first bit 61 indicates that the video signal has not yet been processed by the processor 71 (FIG. 7) and is thus valid. In this case, as previously explained, the first bit 61 becomes a logic "1". Turning to FIG. 8, this logic "1" is supplied from a voltage source 90 to the flip-flop 84-1 via the gate circuits 82-1 and 83-1. If the processor 71 (FIG. 7) has finished processing the corresponding video signal, this video signal will become invalid. Therefore, the first bit of the flag byte is changed to a logic "0" state by this processor 71 via the data bus $d_3$, the multiplexer 74 and the data bus $d_2$ (see FIG. 7).

The abbreviating information indicated by the second bit 62 indicates whether or not the video signal contains significant video information which corresponds to the character or bar-code to be read. When the scanning line (31-1, 31-2 . . . 31-n in FIG. 3) intersects with a part of the area which includes the character, the video signal will change from "white" to "black" and vice versa. When at least one bit-change from "0" to "1" occurs in the quantized video signal transferred over line L (FIG. 7), this bit-change from "0" to "1" is detected by a flip-flop 91 (FIG. 8) and a logic "1" state is maintained. This logic "1" is transferred to the flip-flop 84-2 by way of the gate circuits 82-2 and 83-2. As a result, the second bit 62 (FIG. 6) will be changed from a logic "0" to a logic "1". Contrary to the above, during when the scanning line is intersecting with only certain white area on the document D (FIG. 3), the flip-flop 91 will maintain a logic "0" state. As a result, the second bit 62 will still be a logic "0". When this second bit 62 is a logic "0", as previously explained, the processor 71 (FIG. 1) can omit the step of processing the data contained in the corresponding video bytes. Accordingly, such data may be abbreviated. The classifying information indicated by the third bits 63 indicates that the video signal is produced by a typed alphabet letter, numeral or etc., a handwritten alphabet letter or numeral. This classifying information in the flag byte f (FIG. 6) is indicated by the third bit through the eighth bit which are, respectively, produced by the flip-flops 84-3 through 84-8 in FIG. 8, in which FIG. 8 flip-flops 84-5 through 84-7 are not shown for the sake of brevity.

Generally, the document D is divided into a plurality of fields. For example, the first field should be filled with a typed numeral, the second field with a handwritten Chinese character, the third field with a handwritten numeral and so on. Accordingly, if the video bytes are derived from the first field, the flag byte f corresponding to these video bytes should send on instruction to the processor 71 (FIG. 1) instructing that the video bytes should be processed and recognized under a typed character recognition mode. Similarly, if the video bytes are derived from the second field, the flag byte should send on instruction to the processor 71 (FIG. 7) instructing that the corresponding video bytes should be processed and recognized under a handwritten character recognition mode. In FIG. 8, the above-mentioned instruction to the processor 71 is supplied from a decoder 93 and each of the six bits of the instruction is respectively stored in the flip-flops 84-3 through 84-8. The decoder 93 decodes the output of a second counter II 92. The counter 92 receives step pulses from the scanner 11 (FIG. 7). One step pulse is provided every time a scanning line 31-1, 31-2 . . . 31-n in FIG. 3) is scanned by the scanner 11. If the above-mentioned first field includes, for example, 10,000 scanning lines, the flip-flops 84-3 through 84-8 store the respective bits from the decoder 93 during the time when the counter 92 counts from 0 to 10,000 step pulses, for indicating that the processor should process and recognize the video bytes under a typed numeral recognition mode. Similarly, if the third field includes, for example, 5,000 scanning lines, the flip-flops 84-3 through 84-8 store the respective bits from the decoder 93 during when the counter 92 counts from 0 to 5,000 step pulses, for indicating that the processor should process and recognize the video bytes under a handwritten Chinese character recognition mode.

The control information regarding respective scanning lines stored in the flip-flops 84-1 through 84-8 are simultaneously transferred to the flag byte area F (FIG. 5B) in the main memory when the gate circuits 85 become open again under control of the counter 86. At this time, after the counter 86 finishes counting 128 bits of the quantized video signal transferred over the line L, one scanning operation with respect to one of the scanning lines (31-1 31-2 . . . 31-n in FIG. 3) is completed. Before the next scanning operation begins, reset pulses are applied to the respective reset terminals (R) of the flip-flops 84-1 through 84-8 and 91. Thereafter, these flip-flops are simultaneously changed to their initial logic "0" states.

As mentioned above, the flag byte according to the invention is very useful. Due to the presence of the flag byte, the processor is allowed to process only the significant data stored in the main memory. If an insignificant area exists on the document, the third group of bits 63 (FIG. 6) of the flag byte may further include a unit of END information. In this case, the processor is allowed to stop processing the insignificant data by using the END information, although the scanner still continues to scan the document and the following video data still continues to be stored in the main memory. Furthermore, the presence of the flag byte eliminates the need for a complicated control operation in the character reader according to the prior art, as described hereinafter. The scanner scans, at constant speeds, the characters to be read on the document, serially one after another. However, in the recognition circuit 19 (FIG. 1), the time required for recognition of the characters is not constant. For example, the time required for recognition of handwritten characters is far longer than the time required for recognition of typed characters. Accordingly, a case may occur, wherein recognition of certain handwritten characters by the recognition circuit takes place much later than scanning of the other characters by the scanner. In such a case, the control operation involving the multiplexer 17 (FIG. 1), the one-character memories 18-1 through 18-3 (FIG. 1) and the recognition circuit 19 (FIG. 1) is usually very complicated. Accordingly, the hardware for achieving this control operation becomes very large in size. However, in the present invention, this disadvantageous condition does not occur. This is because, the processor can sequentially process and recognize the video signals stored in the main memory, one video signal after another, under the control of the control information contained in the flag byte, independently from the scanning operation performed by the scanner.

What I claim is:

1. A character reader for reading at least one of either characters or patterns from a document comprising:
    a scanner means for scanning said document on a line by line basis producing an output signal bearing a relationship to said document;
    a pre-processing means for receiving said scanner output signal and for producing quantized video signals bearing a relationship to said scanner output signal;
    a main memory means comprising a flag byte area and a video byte area for storing said quantized video signals from said pre-processor means;
    a processor means for receiving said quantized video signals from said main memory means and for processing and recognizing said quantized video signals, said processor means controlled by control programs transmitted to said processor means from a control storage means;
    a multiplexer means connected between said preprocessor means and said main memory means and further connected between said main memory means and said processor means for routing said quantized video signals;
    a memory interface control unit means connected between said pre-processor means and said multiplexer means for controlling the flow of signals from said pre-processor means to said multiplexer means and for producing a plurality of video signal units from the quantized video signals of said pre-processing means, each of said video signal units corresponding to a signal scanning line scanned by said scanner means and comprising a plurality of bytes, said video signal units stored in said video byte area of said main memory;
    said memory interface control unit means generating a plurality of units of control information, each unit of control information corresponding to one of said video signal units, the coding of each unit of control information dependent upon the coding of its respective video signal unit, and said control information units stored in said flag byte area of said main memory;
    wherein each of said video signal units is supplied to said processor means with its respective control information unit and said processor means processes and recognizes each video signal unit sequentially with said respective control information unit being processed by said processor means to provide control instructions to said processor means.

2. A character reader for reading at least one of either characters or patterns from a document comprising:
    a scanner means for scanning said document on a line by line basis producing an output signal bearing a relationship to said document;
    a pre-processing means for receiving said scanner output signal and for producing quantized video signals bearing a relationship to said scanner output signal;
    a main memory means comprising a flag byte area and a video byte area for storing said quantized video signals from said pre-processor means;
    a processor means for receiving said quantized video signals from said main memory means and for processing and recognizing said quantized video signals, said processor means controlled by control programs transmitted to said processor means from a control storage means;

a multiplexer means connected between said pre-processor means and said main memory means and further connected between said main memory means and said processor means for routing said quantized video signals;

a memory interface control unit means connected between said pre-processor means and said multiplexer means for controlling the flow of signals from said pre-processor means to said multiplexer means and for producing a plurality of video signal units from the quantized video signals of said pre-processing means, each of said video signal units corresponding to a signal scanning line scanned by said scanner means and comprising a plurality of bytes, said video signal units stored in said video byte area of said main memory;

said memory interface control unit means generating a plurality of units of control information with each unit corresponding to one of said video signal units, said control information units stored in said flag byte area of said main memory;

wherein each of said video signal units is supplied to said processor means with its respective control information unit and said processor means processes and recognizes each video signal unit sequentially with said respective control information unit being processed by said processor means to provide control instructions to said processor means; and wherein said memory interface control means comprises a plurality of flip-flops connected as a serial-in/parallel-out shift register, said first stage of said shift register receiving said quantized video from said pre-processor means and the output bits of said shift register being stored in said video byte area of said main memory means.

3. A character reader for reading at least one of either characters or patterns from a document comprising:

a scanner means for scanning said document on a line by line basis producing an output signal bearing a relationship to said document;

a pre-processing means for receiving said scanner output signal and for producing quantized video signals bearing a relationship to said scanner output signal;

a main memory means comprising a flag byte area and a video byte area for storing said quantized video signals from said pre-processor means;

a processor means for receiving said quantized video signals from said main memory means and for processing and recognizing said quantized video signals, said processor means controlled by control programs transmitted to said processor means from a control storage means;

a multiplexer means connected between said pre-processor means and said main memory means and further connected between said main memory means and said processor means for routing said quantized video signals;

a memory interface control unit means connected between said pre-processor means and said multiplexer means for controlling the flow of signals from said pre-processor means to said multiplexer means and for producing a plurality of video signal units from the quantized video signals of said pre-processing means, each of said video signal units corresponding to a signal scanning line scanned by said scanner means and comprising a plurality of bytes, said video signal units stored in said video byte area of said main memory;

said memory interface control unit means generating a plurality of units of control information with each unit corresponding to one of said video signal units, said control information units stored in said flag byte area of said main memory;

wherein each of said video signal units is supplied to said processor means with its respective control information unit and said processor means processes and recognizes each video signal unit sequentially with said respective control information unit being processed by said processor means to provide control instructions to said processor means;

wherein said memory interface control unit means comprises a plurality of flip-flops connected as a parallel-in/paralled-out register, each of said flip-flops receiving a corresponding bit of one of said units of control information and the output bits of said parallel-in/parallel-out register being stored in said flag byte area of said main memory means;

and wherein said one unit of control information contains a piece of information selected from the group consisting of: abbreviating information, validating information, classifying information, and end information.

4. A character reader as set forth in claim 3 wherein a specified group of said flip-flops indicate said classifying information, each of said specified group of flip-flops receives a respective output bit of a decoder which detects the position of said scanner on said document and determines whether said each video signal is produced by scanning one of either a typed character, a handwritten character or a predetermined pattern.

5. A character reader as set forth in claim 3, wherein a specified one of said flip-flops indicates said end information, said end information further indicating that subsequent quantized video signals need not be processed and recognized by said processor means.

6. A character reader as in claim 3, wherein a specified one of said flip-flops which indicates said abbreviating information receives an output from another flip-flop which receives said quantized video signal and is set to a logic "1" state when said quantized video signal corresponds to the scanner scanning one of said either characters or patterns to be read on said document.

7. A character reader as in claim 3, wherein a specified one of said flip-flops which indicates said validated information receives an output from a voltage source and is set to a logic "1" state stored in said main memory means indicates that the corresponding quantized video signal must be processed and recognized by said processor means.

8. A character reader as in claim 3, wherein said logic "1" state stored in said main memory means is changed by said processor means to a logic "0" state when said processor means finishes processing and recognizing said corresponding quantized video signal.

* * * * *